United States Patent [19]

Thoma

[11] 3,929,964

[45] Dec. 30, 1975

[54] PROCESS FOR THE CONVERSION OF SODIUM SULFITE

[76] Inventor: Matthias Thoma, Johann-Strauss-Strasse 8, 8264 Waldkraiburg, Germany

[22] Filed: Sept. 23, 1974

[21] Appl. No.: 508,401

[30] Foreign Application Priority Data

Oct. 5, 1973 Germany............................ 2350191

[52] U.S. Cl. ................ 423/183; 423/166; 423/242; 423/428; 423/438; 438/532; 423/555; 423/642; 260/628

[51] Int. Cl.² ........................................... C01D 1/20

[58] Field of Search ........... 423/183, 186, 187, 189, 423/190, 422, 423, 424, 426, 427, 491, 499, 512, 539, 541 A, 532, 533, 622, 642, 643; 260/628

[56] References Cited

UNITED STATES PATENTS

| | | | |
|---|---|---|---|
| 2,180,755 | 11/1939 | Carrels et al. | 423/643 |
| 2,259,409 | 10/1941 | Wenzel et al. | 423/622 |
| 2,927,001 | 3/1960 | McCulloush | 423/532 |
| 3,329,479 | 7/1967 | Hustinx | 423/190 |
| 3,535,083 | 10/1970 | Smith | 423/242 |
| 3,846,535 | 11/1974 | Fonseca | 423/422 |

*Primary Examiner*—Oscar R. Vertiz
*Assistant Examiner*—Gary P. Straub

[57] ABSTRACT

The sodium sulfite obtained as a byproduct in the production of hydroxy aromatic compounds from aromatic hydrocarbons, sulfur trioxide and sodium hydroxide, is converted into sulfur trioxide and sodium hydroxide for recirculation of same in said production of hydroxy aromatic compounds, by a process wherein: (a) the sodium sulfite is reacted with zinc chloride to form sodium chloride and zinc sulfite; (b) the zinc sulfite is heated to form zinc oxide and sulfur dioxide and the sulfur dioxide is oxidized to sulfur trioxide; (c) the sodium chloride is reacted with ammonium bicarbonate to form ammonium chloride and sodium bicarbonate; (d) the zinc oxide is reacted with the ammonium chloride to form zinc chloride and ammonia; (e) the ammonia is reacted in the Solvay Process to form ammonium bicarbonate; and (f) the sodium bicarbonate is heated to form sodium carbonate and carbon dioxide, and the sodium carbonate is reacted with calcium oxide to form sodium hydroxide.

6 Claims, No Drawings

PROCESS FOR THE CONVERSION OF SODIUM SULFITE

This invention relates to a process for converting sodium sulfite into sulfur trioxide and sodium hydroxide.

It is well-known that during the production of hydroxy aromatics from aromatic sulphonic acids with sodium hydroxide equivalent quantities of sodium sulfite are obtained as a by-product.

On the basis of the present pollution regulations, sodium sulfite may be used in the production of cellulosic material only in a very small extent. For this reason sodium sulfite has to be utilized or removed in a form corresponding to the pollution laws.

A well-known method for processing sodium sulfite is its oxidation into sodium sulfate or its neutralization, by means of suitable acids, into sodium salts that can be re-used. These procedures, however, are costly and time-consuming and furthermore additional chemicals are consumed. Moreover it has to be mentioned that up to now no possibility has been found for the removal of sodium sulfate simultaneously solving the pollution problem satisfactorily.

The present invention is based on the task of supplying a non-pollution processing of sodium sulfite which can be carried out simply without obtaining any by-products.

According to this invention this aim is reached by converting sodium sulfite into sodium hydroxide and sulphur trioxide and re-using it in a circulation step for the production of hydroxy aromatics, whereby a. sodium sulfite is converted into sodium chloride and zinc sulfite by means of zinc chloride,
b. zinc sulfite is converted into zinc oxide and sulphur dioxide by heating and the latter is processed into sulphur trioxide by oxidation,
c. sodium chloride is converted by means of ammonium bicarbonate in order to form ammonium chloride and sodium bicarbonate,
d. zinc oxide with the ammonium chloride obtained in (c) is converted into zinc chloride in order to recover the zinc chloride consumed in the conversion of sodium sulfite,
e. the ammonia liberated in (d) is used for the formation of ammonium bicarbonate, and
f. the sodium bicarbonate is processed into sodium carbonate and carbon dioxide by heating, and sodium carbonate is processed into sodium hydroxide by means of calcium oxide.

The process of the present invention is carried out in the form of a circulation process and has the advantage that the reactants required for the different, necessary chemical conversions are reformed in the course of the single steps of the process and the resulting by-products are consumed again so that after completion of a process cycle no by-products have to be removed.

The conversion of zinc oxide with ammonium chloride into zinc chloride and ammonia is practically quantitative. Moreover in the conversion of sodium sulfite according to the present invention exactly those materials are formed or may be converted into such without any particular problems, which are required for the production of hydroxy aromatics from aromatic sulphonic acids and sodium hydroxide.

Thus the progress of the present invention represents a technical and economical progress also in this respect.

The sodium carbonate obtained during the conversion step represents no problem concerning the pollution laws. Sodium carbonates are harmless and furthermore sodium carbonates are required by numerous branches of industry.

During the conversion of sodium sulfite by means of zinc chloride on one hand sodium chloride is obtained which can be converted into soda by the generally known Solvay process or possibly, when using calcium hydroxide, also into sodium hydroxide. On the other hand the zinc sulfite formed in the conversion of sodium sulfite by means of zinc chloride is decomposed on heating into sulphur dioxide and zinc oxide which is reacted together with the ammonium chloride obtained in the Solvay process and which is used for the recovery of zinc chloride. The reaction is practically quantitative. The resulting ammonia, in turn, is used in the Solvay process. Sulphur dioxide is oxidized into sulphur trioxide and is employed as such or as sulphuric acid for the sulfonation step.

This means: in this process the formation of undesired by-products is completely prevented as the materials required for the processing of sodium sulfite are recovered completely, i.e. practically quantitatively during the process and the by-products obtained in the conversion are consumed again completely, too.

As already mentioned in the conversion of sodium sulfite according to the present invention exactly those materials are recovered which are required in the manufacture of hydroxy aromatics from aromatic sulphonic acids with sodium hydroxide, namely sulphur trioxide and sodium hydroxide.

The process of this invention for the conversion of sodium sulfite is thus combined with the well-known process for the production of hydroxy aromatics from aromatic sulphuric acids and sodium hydroxide in the form of a circulation process in such a way that the sodium sulfite obtained as a by-product in the production of hydroxy aromatics is converted according to this process into the initial products sulphur dioxide and sulphur trioxide and alkali hydroxide respectively required for the production of the hydroxy aromatics.

Details of this invention are given in the below description of illustrative examples to which, however, the invention is not limited.

EXAMPLE 1

An about 15–20% aqueous solution of sodium sulfite from a melt of sodium hydroxide and aryl sulphonic acid is mixed with zinc chloride.

sodium sulfite 126 kilos
water 500 kilos
zinc chloride 136 kilos

The conversion takes place at 25°–30°C. The hereby practically quantitatively obtained 145 kgs zinc sulfite are separated from the about 19% sodium chloride solution. By heating zinc sulfite in usual manner, 64 kgs sulphur dioxide are liberated and 81.5 kgs zinc oxide are obtained.

Converting the sodium chloride solution with ammonium bicarbonate into sodium carbonate and further into sodium hydroxide according to the Solvay process, the ammonium chloride formed during this process will be left. Zinc oxide, together with ammonium chloride, will give zinc chloride and ammonia. Whereas ammonia is recirculated for the conversion of sodium chloride, zinc chloride is reused for conversion.

This example clearly proves that by means of zinc chloride alkali sulfite may be converted into alkali hydroxide and sulphur dioxide - the latter will give the required sulphur trioxide without causing any troubles - and no by-products are obtained which could be removed only with great difficulties due to the pollution laws.

By this fact the process of the present invention compares favourably to the Solvay process during which calcium chloride in quantities equivalent to those of the converted sodium chloride are obtained and which have been removed into waters in the past and caused considerable pollution.

Below are the chemical conversions in the form of chemical reaction equations obtained during the process of example 1:

1. $Na_2SO_3 + ZnCl_2 = 2\ NaCl + ZnSO_3$
2. $2\ NaCl + 2\ NH_4HCO_3 = 2\ NaHCO_3 + 2\ NH_4Cl$
3. $2\ NaHCO_3 = Na_2CO_3 + CO_2 + H_2O$
4. $Na_2CO_3 + CaO + H_2O = CaCO_3 + 2\ NaOH$
5. $CaCO_3 = CaO + CO_2$
6. $ZnSO_3 = ZnO + SO_2$
7. $ZnO + 2\ NH_4Cl = ZnCl_2 + 2\ NH_3 + H_2O$

Herefrom it can be realized that the process of this invention gives a conversion of sodium sulfite into sodium hydroxide and sulphur dioxide without by-products are obtained or consumed. On the contrary, all reactants are recovered quantitatively during the process.

If instead of sodium hydroxide sodium carbonate is required, then the procedures described in equations (4) and (5) may be left away without any change in the course of the circulation process.

EXAMPLE 2

The initial products are the same as in example 1. Only additional 3–4% of sodium sulfate are added which also is in general present in the aryl alkali hydroxide melt in this amount.

After the formation of 117 kgs of sodium chloride the sodium sulfate will remain in the sodium chloride solution. 2.8 kgs of calcium chloride are added so that sodium sulfate is converted into sodium chloride and 3.7 kgs of calcium sulfate which is separated from the solution by filtration.

The present, purified sodium chloride solution, 120 kgs of sodium chloride, are treated according to our example 1 and to the Solvay process respectively.

The hereby obtained 107 kgs of ammonium chloride are re-converted into 136 kgs of zinc chloride by means of the 81.5 kgs of zinc oxide obtained and the zinc chloride will be used in the following charge.

EXAMPLE 3

Into a flask equipped with stirrer, thermometer and "addition flask"

| | | |
|---|---|---|
| 1.9 moles = | 240.0 grs | sodium sulfite ($Na_2SO_3$) |
| 0.1 moles = | 14.0 grs | sodium sulfate ($Na_2SO_4$) |
| 0.03 moles = | 4.0 grs | phenolic substances |
| | 1,100.0 grs | water |
| | 1,358.0 grs | | are added.

This solution results from the production of hydroxy aromatics by sulfonation of toluol with concentrated sulphuric acid or sulphur trioxide and subsequent conversion by means of sodium hydroxide.

The following is added:

| | | |
|---|---|---|
| 1.9 moles = 258 grs $ZnCl_2$ | reaction is complete after |
| water | 30 minutes at about 20°C |

Composition of the combined solution:

| | | |
|---|---|---|
| 1.8 moles = | 260 grs | $ZnSO_3$ |
| 3.6 moles = | 211 grs | NaCl |
| 0.1 moles = | 14 grs | $ZnCl_2$ |
| 0.1 moles = | 14 grs | $Na_2SO_4$ |
| 0.1 moles = | 13 grs | $Na_2SO_3$ |
| | 4 grs | phenolic substances |
| | 1,120 grs | water |
| | 1,636 grs | | the insoluble $ZnSO_3$ is filtered off and washed with a part of the distillate to be recovered later until it is free of chlorine.

260 grs $ZnSO_3$, moist, are introduced by a pipe heated externally at about 320°C from the top successively so that there is no considerable loss in temperature.

The conversion into ZnO and $SO_2$ is carried out at more than 96% and with correspondingly long periods $ZnSO_3$ may be converted practically quantitatively.

Whereas the resulting 146 grs ZnO and
8 grs. ZnO from the precipitation with $NH_3$, amounting to
154 grs are used for the later conversion of ammonium chloride ($NH_4Cl$) obtained in the process into $ZnCl_2$ and $NH_3$ (animides), the recovered $SO_2$ gas is oxidized in usual manner with air or oxygen into $SO_3$ and is employed as such or as sulphuric acid for sulfonation again. This described way of recovering $SO_2$–$SO_3$ from the $Na_2SO_3$ necessarily obtained in the manufacturing process is a part of the circulation process, i.e. the relevant sulfonation of the initial product to be sulfonated, as e.g. toluol, is carried out with $SO_2$ (oxidized into $SO_3$) from the $Na_2SO_3$.

The filtrate obtained after separation of $ZnSO_3$ consists of:

| | | |
|---|---|---|
| 211 grs | NaCl | — sodium chloride |
| 14 grs | $ZnCl_2$ | — zinc chloride |
| 14 grs | $Na_2SO_4$ | — sodium sulfate |
| 13 grs | $Na_2SO_3$ | — sodium sulfite |
| 4 grs | phenolic substances | |
| 1,300 grs | water | |
| 1,556 grs | | |

Balance:
1,556 grs $Na_2SO_4$ is obtained by partial oxidation of $Na_2SO_3$ during the production of hydroxy aromatics. In order to obtain no enrichment of $Na_2SO_4$, the solution is mixed with such an amount of $BaCl_2$ so that $Na_2SO_4$ as well as the still present $Na_2SO_3$ are precipitated as $BaSO_4$ and $BaSO_3$.

42 grs $BaCl_2$
1,598 grs Adter heating and filtration a residue of
45 grs is obtained (consisting of $BaSO_4$ and $BaSO_3$)
1,553 grs as well as a solution consisting of
235 grs NaCl
14 grs $ZnCl_2$
4 grs phenolic substances
1,339 grs water
1.592 grs After addition of
15 grs 25% ammonia solution the resulting precipitate consisting of
10 grs $Zn(OH)_2$ — zinc hydroxide is removed by filtration, and the filtrate consisting of -continued
```
 235 grs  NaCl
  10 grs  NH₄Cl (ammonium chloride)
   4 grs  phenolic substances
1,400 grs  water
─────────
1,649 grs
```
is adjusted to a 23.5% sodium chloride solution by distilling off
```
650 grs water with
3.5 grs phenolic substances.
```

While the distillate with the phenolic substances is re-employed for solving the subsequent fusion melt, the solution consisting of

```
235 grs NaCl — sodium chloride
 10 grs NH₄Cl — ammonium chloride
```
containing traces of organic substances is processed with carbon dioxide and ammonia into sodium carbonate and sodium hydroxide respectively according to the Solvay process.

By filtration sodium bicarbonate is separated from the solution. Its composition is:
79.2%, $NaHCO_3$
0.6%, $NH_4HCO_3$
0.5%, $NaCl$
0.4%, $NH_4Cl$
19.3%, water
The filtrate containing

```
  28.0 grs NaCl
 198.0 grs NH₄Cl
  51.0 grs NaHCO₃
  38.0 grs NH₄HCO₃
 860.0 grs water
─────────
1,175.0 grs
```
is mixed with the recovered
```
 154.0 grs ZnO — zinc oxide
```
and evaporated to a slurry. A part of the ammonium chloride is already decomposed and thus ammonia excapes. The conversion of more than 95% is reached by spontaneously heating the slurry to 480°C.
Whereas all of the ammonia is recirculated for the conversion of NaCl into NaHCO₃, the residue consisting of
```
 200.0 grs ZnCl₂
  33.0 grs ZnO
  64.0 grs NaCl
  10.0 grs NH₄Cl
─────────
 307.0 grs
```
is used for the subsequent conversions of $Na_2SO_3$.

The by-products included in the $ZnCl_2$ residue, like NaCl, NH₄Cl, do not cause any troubles as the subsequent reactions are incorporating these chemicals.

From this example it can be clearly noted that beside of the usual losses incurring during operation a real circulation is given, for NaOH as well as for $SO_2$ and $SO_3$ respectively. It is not very important to obtain quantitative conversions in the relevant reactions as the single components will always reappear in the circulation step. Only some percent of $SO_2$ are to be replaced as the oxidation product of about 4–5% of $Na_2SO_4$ will be lost as $BaSO_4$.

What is claimed is:
1. A process for the conversion of sodium sulfite, obtained in the production of hydroxy aromatics, into sodium hydroxide and sulphur trioxide for recirculation in said production of hydroxy aromatics, which comprises:
a. reacting said sodium sulfite with zinc chloride to form sodium chloride and zinc sulfite,
b. heating said zinc sulfite to form zinc oxide and sulphur dioxide and oxidizing said sulfur dioxide to sulphur trioxide,
c. reacting said sodium chloride with ammonium bicarbonate to form ammonium chloride and sodium bicarbonate,
d. reacting said zinc oxide with said ammonium chloride to form zinc chloride and ammonia,
e. converting said ammonia to form ammonium bicarbonate, and
f. heating said sodium bicarbonate to form sodium carbonate and carbon dioxide, and reacting said sodium carbonate with calcium oxide to form sodium hydroxide.
2. A process as in claim 1 wherein the zinc chloride produced in step (d) is recirculated for reaction with sodium sulfite in step (a).
3. A process as in claim 1 wherein the ammonium bicarbonate produced in step (e) is recirculated for reaction with sodium chloride in step (c).
4. A process as in claim 1 wherein calcium carbonate is produced along with sodium hydroxide in step (f), said calcium carbonate is heated to form calcium oxide and carbon dioxide, and said calcium oxide is recirculated for reaction with additional sodium carbonate in step (f).
5. A process as in claim 1 wherein sodium sulfate is present with sodium sulfite in the starting composition and is carried through step (a) in admixture with said sodium chloride, and wherein prior to step (b), said sodium sulfate in the admixture is reacted with calcium chloride to form sodium chloride and calcium sulfate, said calcium sulfate then being separated.
6. In a process for the conversion of sodium sulfite, obtained in the production of hydroxy aromatics, into sodium carbonate and sulfur trioxide, for recirculation in said production of hydroxy aromatics, which comprises:
a. reacting said sodium sulfite wich zinc chloride to form sodium chloride and zinc sulfite,
b. heating said zinc sulfite to form zinc oxide and sulphur dioxide and oxidizing said sulfur dioxide to sulphur trioxide,
c. reacting said sodium chloride with ammonium bicarbonate to form ammonium chloride and sodium bicarbonate,
d. reacting said zinc oxide with said ammonium chloride to form zinc chloride and ammonia,
e. converting said ammonia to form ammonium bicarbonate, and
f. heating said sodium bicarbonate to form sodium carbonate and carbon dioxide.

* * * * *